United States Patent [19]

Grinn

[11] Patent Number: 4,930,836
[45] Date of Patent: Jun. 5, 1990

[54] DOOR ASSEMBLY FOR PICK-UP TRUCKS

[75] Inventor: Gary J. Grinn, Farmington Hills, Mich.

[73] Assignee: Ford Motor Company, Dearborn, Mich.

[21] Appl. No.: 211,022

[22] Filed: Jun. 24, 1988

[51] Int. Cl.⁵ .............................................. B60J 5/04
[52] U.S. Cl. .................................. 296/146; 296/183; 292/DIG. 21; 70/DIG. 65
[58] Field of Search ............... 296/146, 183, 190, 202; 292/5, DIG. 21, DIG. 67; 70/DIG. 65

[56] References Cited

U.S. PATENT DOCUMENTS

| | | | |
|---|---|---|---|
| 1,951,863 | 3/1934 | De Vizcaya | 296/146 X |
| 2,084,600 | 6/1937 | Sparkman | 296/64 |
| 2,567,294 | 9/1951 | McClintock | 296/187 |
| 2,733,096 | 1/1956 | Waterhouse et al. | 296/202 X |
| 2,827,321 | 3/1958 | Leslie et al. | 292/5 |
| 2,937,043 | 5/1960 | Griswold, Jr. et al. | 292/5 |
| 2,997,336 | 8/1961 | Huggins et al. | 296/146 X |
| 3,149,864 | 9/1964 | Foster | 292/21 |
| 3,666,305 | 5/1972 | Schlichter | 292/48 |
| 3,907,357 | 9/1975 | Davis, Jr. | 296/146 |
| 4,653,229 | 3/1987 | Feucht et al. | 49/367 |

FOREIGN PATENT DOCUMENTS

| | | | |
|---|---|---|---|
| 3537304 | 4/1987 | Fed. Rep. of Germany | 296/146 |
| 724088 | 11/1966 | Italy | 296/146 |
| 621274 | 4/1949 | United Kingdom | 296/146 |

Primary Examiner—Dennis H. Pedder
Attorney, Agent, or Firm—Daniel M. Stock; Clifford L. Sadler

[57] ABSTRACT

An improved door assembly, especially for pick-up trucks, consists of a conventional front door and a rear auxiliary door latchingly secured together. The rear door is latched to the truck body and is overlapped by the front door in their closed positions requiring sequential opening.

1 Claim, 3 Drawing Sheets

DOOR ASSEMBLY FOR PICK-UP TRUCKS

BACKGROUND OF THE INVENTION

The present invention relates generally to automotive vehicle bodies, and more particularly to the construction and arrangement of such bodies as utilized in the design and manufacture of light trucks.

DESCRIPTION OF THE PRIOR ART

Pick-up truck cabs are conventionally constructed in a manner in which a single door is pivotally mounted on each side of the vehicle body to allow ingress and egress to seating positions for the driver and passengers of the vehicle. This construction is sometimes modified by extending the length of the cab and installing a pair of doors, each one positioned rearwardly of the normal front doors. In such extended cab configurations, a pillar extending from the floor to the roof of the cab is provided between the pairs of doors on each side and sets of latching components are installed between the pillar and each door. Similar constructions have been used from time to time in other vehicle applications in the automotive industry. Exemplary of such prior art uses of double side door construction are those shown U.S. Pat. No. 2,084,600 to Sparkman, U.S. Pat. No. 2,567,294 to McClintock, U.S. Pat. No. 2,997,336 to Huggins et al and U.S. Pat. No. 3,907,357 to Davis, Jr. The prior art double door construction suffers from the disadvantage that their dependence upon interaction with intermediate portions of the vehicle body such as the previous mentioned floor-to-roof pillar interferes with the efficient use of the ingress/ egress aperture defined by the doors. It is common for the rear of the two side doors of a pick-up cab to be a small auxiliary door which may enclose either seating or is significantly impeded by the presence of the intermediate body structure. In other environments, the use of double doors is well known. U.S. Pat. No. 4,653,229 to Feucht et al. is exemplary of such double door construction in general, and in the automotive body arts, it is known to close smaller openings, such as at the rear of a van type vehicle with a pair of pivotally mounted doors of equal size which latchingly engage each other. In such constructions, however, each door is mounted on a vertical pillar extending from floor to roof of the vehicle. It is unprecedented, however, to provide door closure for the side of a vehicle body in which no such pair of floor-to-roof pillars is provided and no vertical intermediate body structure is provided between the front and rear pillars of the body upon which the doors are pivotally mounted.

SUMMARY OF THE INVENTION

Responsive to deficiencies of the prior art, the present invention provides an improved door assembly for the side doors of a light truck in which a continuous aperture is formed through the side of the vehicle body extending from front pillars having upper, rearwardly canted portions to rear pillars thereof, and a rear door is pivotally mounted at the rear pillar, a front door is pivotally mounted at the front pillar, the rear door being effective to close a portion of the aperture, and the front door moving to a overlying position with respect to the rear door to effect closure of the remainder of the aperture.

According to one feature of the invention, a primary latch assembly is operatively disposed between the trailing edge of the front door and the leading edge of the rear door.

According to another feature of the invention, a secondary latch assembly is operatively disposed between portions of the vehicle body outside of the continuous aperture.

According to yet another feature of the invention, the rear door is constructed to include portions extending over the hinge mechanism through which pivotal mounting to the rear pillar is made to effect concealment of those hinges.

BRIEF DESCRIPTION OF THE DRAWINGS

These and other features will be apparent to those skilled in the automotive body arts upon reading the following description with reference to the accompanying drawing in which.

DESCRIPTION OF THE PREFERRED EMBODIMENT

Figure 1:
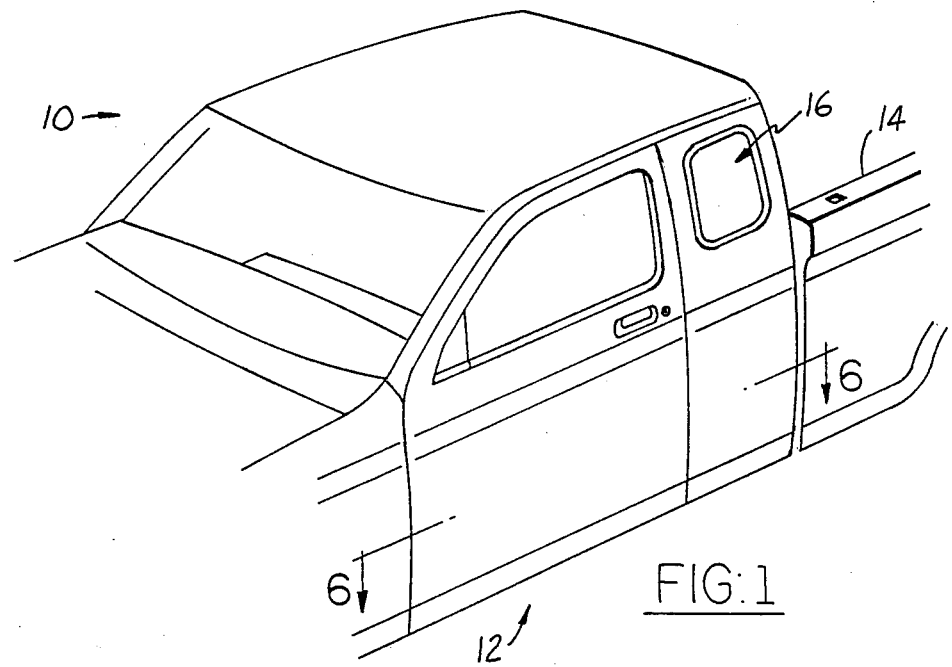
FIG. 1 is a perspective view of a pick-up truck utilizing the door assembly of the present invention.
Figure 2:
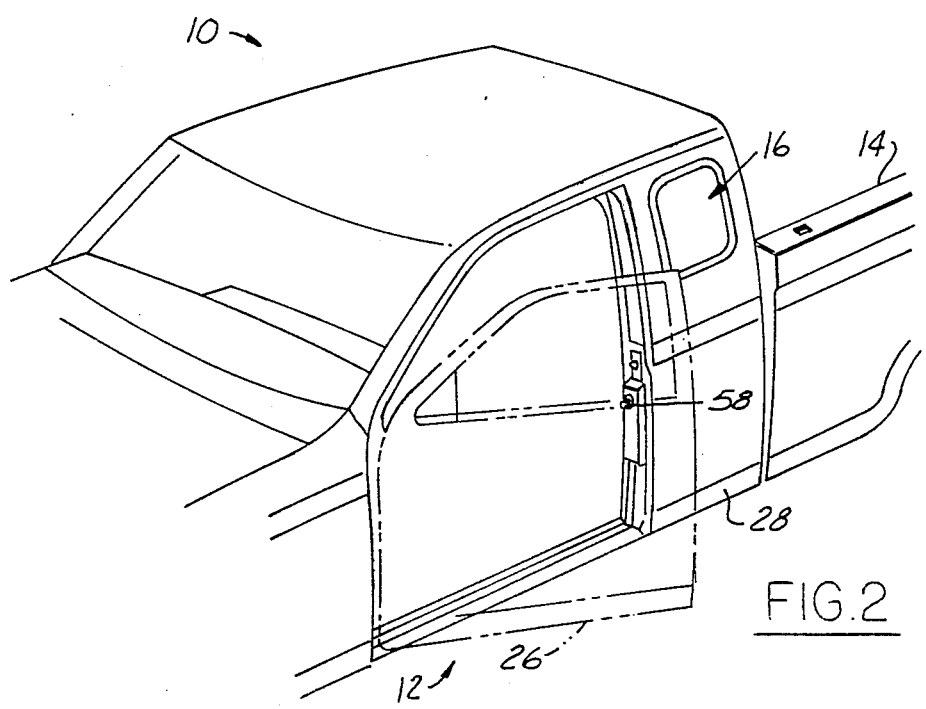
FIG. 2 is a perspective view similar to FIG. 1 in which the front door of the door assembly is shown in dotted lines in a partially opened position.
Figure 3:
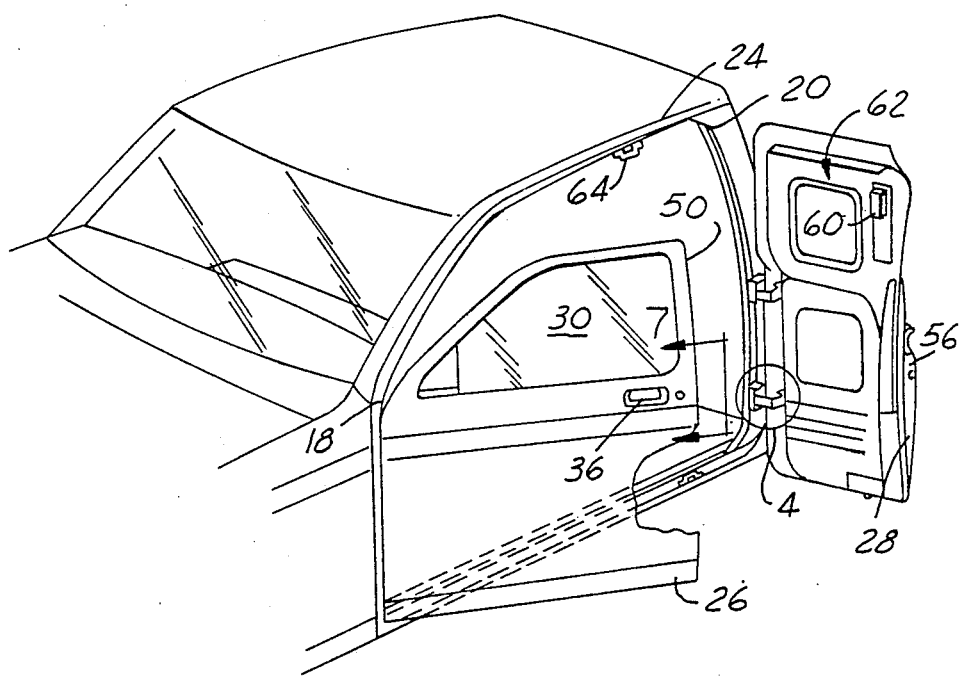
FIG. 3 is another perspective view similar to FIGS. 1 and 2 in which both front and rear doors are shown in opened positions.

Turning now to the drawings, and particularly to FIGS. 1 and 3 thereof, a pick-up truck 10 is illustrated as including a cab portion 12 and a load box portion 14. The cab portion 12 is of the extended type in which a rear compartment indicated generally at 16 is included behind the normal forward seating position of driver and passengers. As may best be seen in FIG. 3, the side of the cab portion 12 is opened by a continuous aperture 13 extending longitudinally from a front pillar structure 18 having a rearwardly canted portion 19 to a substantially vertical rear pillar structure 20 and vertically from floor 22 to roof 24 of the cab portion 12. A front door 26 and a rear compartment door 28 together form with the cab portion 12 a door assembly and are swingably mounted on the cab body to move between positions opening and closing the continuous aperture 13. It is to be understood as the description progresses that while only one side of the cab portion 12 is described, the other side is preferably symmetrically constructed.

Figure 8:
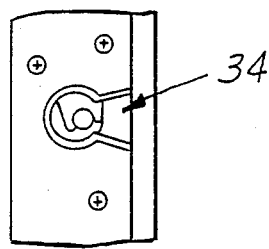
FIG. 8 is a view of the latch similar to FIG. 7 showing the latch in the closed position engaging the striker of the rear door.
Figure 7:
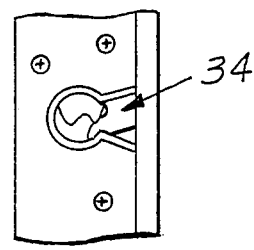
FIG. 7 is a simplified view of the latch assembly of the front door shown and viewed in the direction of the arrows VII—VII of FIG. 3, the latch shown in the unlatched position.

The front door 26 is preferably a conventional vehicle front door. It is swingably mounted on the lower vertical portion of the front pillar 18 through hinges, such as those shown in U.S. Pat. No. 4,532,675 to Salazar, assigned to the assignee of the present invention. It may include a movable window 30 and carries at its trailing edge 32 a latch assembly 34, such as shown in simplified fashion in FIGS. 7 and 8. A suitable latch assembly would be that shown in U.S. Pat. No. 3,666,305 to Schlichter, also assigned to the assignee of the present invention. The latch assembly 34 is conventionally locked, latched and unlatched, through mechanisms well known in the automotive body arts, including an outside door handle, as indicated at 36.

Figure 4:
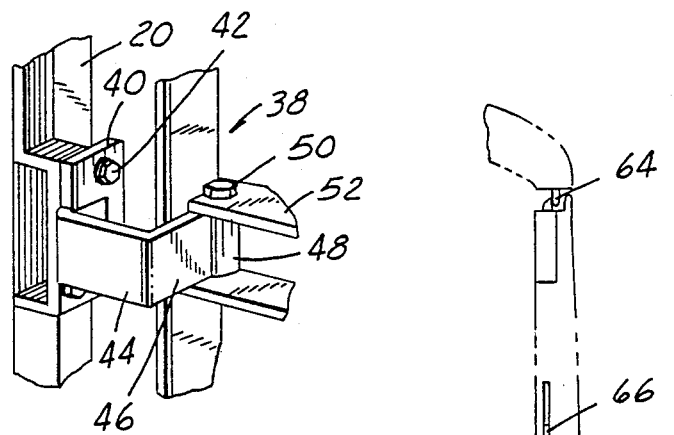
FIG. 4 is an enlarged perspective view illustrating the hinges employed in mounting the rear door of the door assembly of the present invention.
Figure 6:
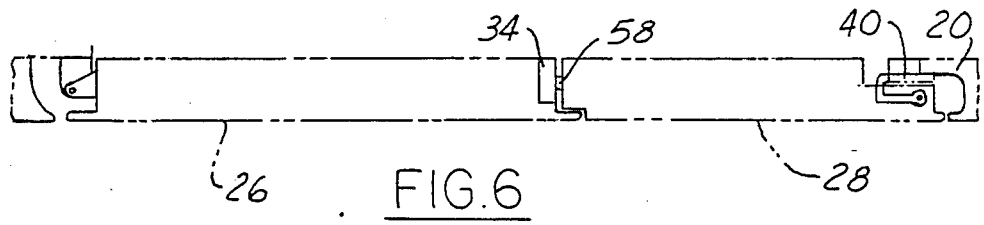
FIG. 6 is a cross-sectional view taken along lines VI—VI of FIG. 1, certain detail removed for clarity.

The rear compartment door 28 includes no outside door handle and is swingably mounted on the vertical rear pillar 20 through a pair of spaced hinges which may be of the type illustrated in FIG. 4. Such hinges, indicated generally at 38, are illustrated as including a body plate 40 fixed to the rear pillar 20 as through a fastener 42. An angle arm 44 extends laterally outwardly from the body pillar 20 and has a bent back portion 46 extending rearwardly to a pivot portion 48 for receiving a pivot pin 50 for supporting a door plate portion 52 secured to the door 28 in a known manner. As may best be seen in FIG. 6, an outer portion 54 of the rear compartment door 28 completely overlies the hinges 38 thereby concealing them and improving the side appearance of the pick-up truck 10. At the leading edge 56 of the rear compartment door 28, a striker bolt 58 projects forwardly to engage the latch assembly 34 carried at the trailing edge of the front door 26.

Figure 5:
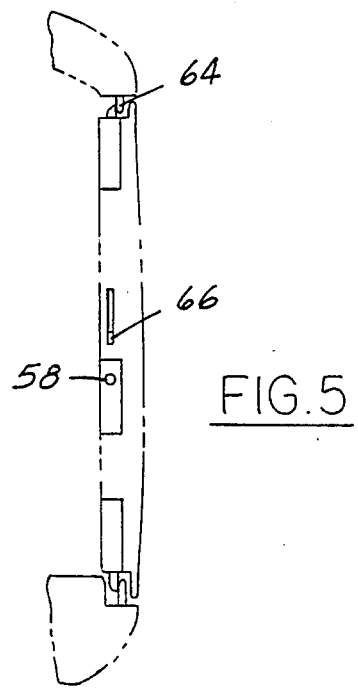
FIG. 5 is a front end view of the rear door shown in the closed position with portions of the vehicle body shown in dot-dash lines.

As may best be seen in FIGS. 3 and 5, a pair of latch bolts 60 are carried on the inner face 62 of the rear compartment door 28 in alignment with a pair of keepers 64 carried on the body of the cab 12 at the floor 22 and the roof 24. Such latch bolts are well known in the automotive industry and are preferably mechanically biased into the latching position shown in FIG. 5 and may be disengaged from that position through manual movement of an operating lever, such as indicated at 66, through interposition of known mechanical linkages between the lever 66 and the bolts 64.

It will be appreciated by consideration of the illustration of FIG. 3, that with the doors 26, 28 in the open position, the continuous aperture 13 through the side of the cab 12 is open for ingress and egress of driver and passengers and the loading and unloading of goods and equipment. Closure of the aperture 13 is effected by first swinging the rear compartment door 28 from the position shown in FIG. 3 to the position shown in FIG. 5 in which the latch bolts 60 engage the keepers 64. After this closure is effected, the front door 26 may be swung from the position of FIG. 3 to the position of FIG. 6 in which the trailing edge 32 of the door 26 overlies the leading edge 56 of the rear compartment door 28, and the striker bolt 58 is latchingly engaged within the latch assembly 34. It will be appreciated that from this closed position, opening of the front door 26 to provide ingress and egress for driver and passengers is possible, but opening of the rear compartment door 28 is prevented until the front door 26 is opened and the lever 66 is moved to a position disengaging the bolts 60 from the keepers 64.

While only one embodiment of the invention door assembly has been shown and described, others may be possible without departing from the scope of the appended claims.

I claim:

1. An improved door assembly for a vehicle body of the type in which two doors, each having front and rear edges, are longitudinally spaced as front and rear doors on at least one side of the vehicle body, the door assembly comprising:

a continuous door aperture formed through the side of the body extending longitudinally between a front pillar having a vertical portion extending upwardly from the body floor and a rearwardly canted portion extending therefrom to the body roof and a rear pillar extending substantially vertically from the body floor to the body roof;

means for pivotally connecting the rear edge of the rear door to the rear pillar for swingable movement between a first position closing a portion of the continuous door aperture and an open position;

means for pivotally connecting the front edge of the front door to the vertical portion of the front pillar for swingable movement between a first position closing the remainder of the continuous door aperture and having rear edge portions overlying the front edge of the rear door and an open position;

a striker member carried on the front edge of the rear door;

a latch assembly carried at the rear edge of the front door for releasably engaging the striker member;

means for operating the latch assembly from an external surface of the vehicle body, the means for operating mounted only to the front door;

upper and lower latch means carried at the top and bottom of the rear door respectively;

upper and lower keeper means carried on the body roof and body floor for latchingly receiving the corresponding upper and lower latch means when the rear door is in the closed position; and operating lever means, carried on the front edge of the rear door and inaccessible when the doors are both in their first positions, for moving the latch means with respect to the keeper means.

* * * * *